Jan. 6, 1959     J. D. COBINE     2,867,679
GAS COMPOSITION FOR COOLING AND INSULATING PURPOSES
Filed Dec. 4, 1952
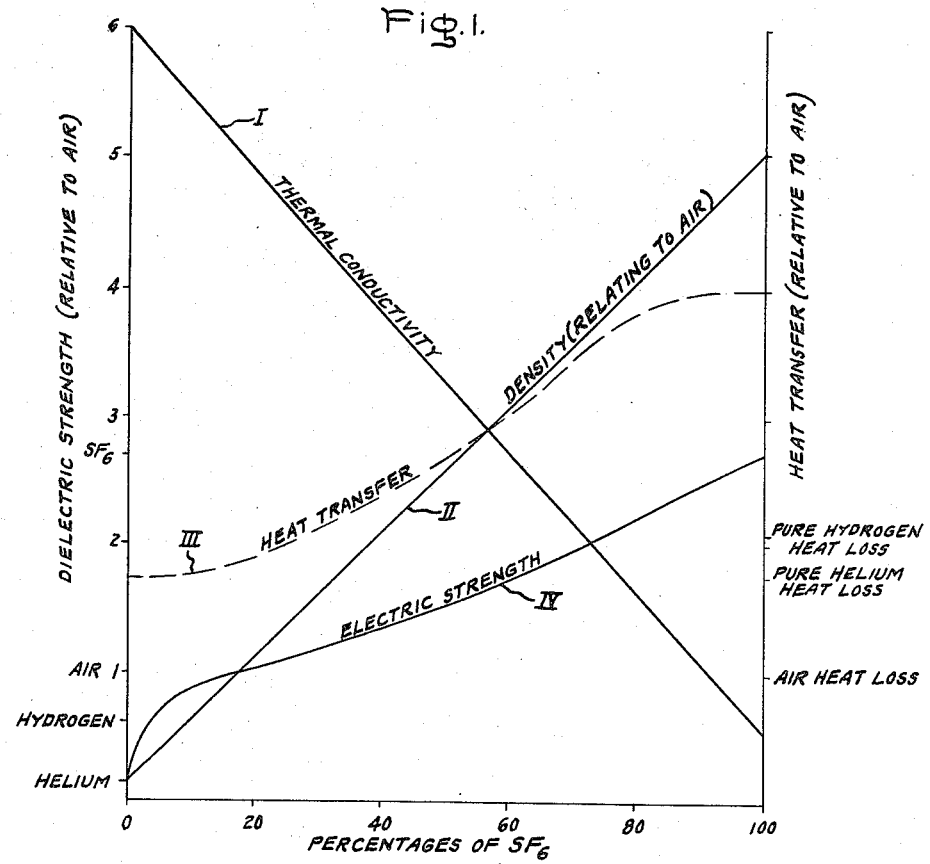
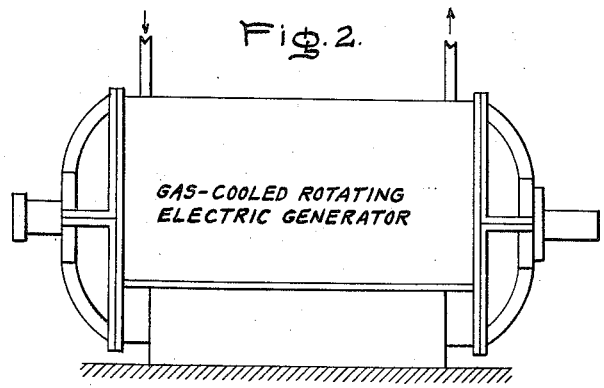
Inventor:
James D. Cobine,
by Paul A. Frank
His Attorney.

United States Patent Office 2,867,679
Patented Jan. 6, 1959

2,867,679

GAS COMPOSITION FOR COOLING AND INSULATING PURPOSES

James D. Cobine, Rexford, N. Y., assignor to General Electric Company, a corporation of New York Application December 4, 1952, Serial No. 324,079

6 Claims. (Cl. 174—17)

The present invention relates to devices in which it is desired to provide a gaseous medium for both cooling and electric insulating purposes. In some cases atmospheric air has sufficiently well served for such purposes. In other cases when a greater rate of heat dissipation has been desired, particularly for rotating machinery, hydrogen has been used as gaseous cooling and insulating media. Hydrogen gas as a heat-dissipating agency must be most carefully safe-guarded because of the explosiveness of mixtures of hydrogen and oxygen, which may be present as an accidental contaminant. Helium gas because of its chemical inertness is free from the hazard of explosion but has a low electric break-down characteristic.

It is the object of my present invention to improve the electric break-down properties of such efficient heat transfer gases as hydrogen and helium without material sacrifice of the good heat-dissipating properties of such gases.

I have discovered that both helium and hydrogen when associated with minor proportions of electronegative gas are greatly improved in dielectric properties, without a proportionate depreciation in heat-dissipating property. The most advantageous embodiments of my invention comprise compositions of helium and an electronegative gas, specifically sulfur hexafluoride. Such gaseous compositions have materially better dielectric properties than helium unassociated with other gas and besides are explosion-proof.

The accompanying drawing illustrates, by the graphs of Fig. 1, the relative dielectric strength and thermal properties of compositions of helium and sulfur hexafluoride which constitute embodiments of my invention; Fig. 2 represents conventionally a gas-cooled electric generator as illustrative of a practical utilization of gas compositions of my invention.

Fig. 1 shows by curve I, on an arbitrary scale and for reference purposes, the thermal conductivity of the mixture of helium and sulfur hexafluoride relative to air; curve II shows the gaseous density of substantially pure helium relative to air; curve III shows the heat transfer characteristic at a selected temperature of mixtures of helium and sulfur hexafluoride; curve IV shows the electric breakdown characteristic (spark voltage) of a range of mixtures of helium and sulfur hexafluoride taken with electrodes separated by a gap of 0.1". With respect to the curves and to all mixtures referred to hereinafter, it is to be understood that the term "percentage mixtures of gases" refers to their volumes.

The advantages accruing with respect to the enhanced insulating or electric breakdown strength of such mixture is not detrimentally offset by loss of heat-dissipating values. The values indicated by the graphs represent practical results obtained by experiment as contrasted with theoretical values. The heat transfer values shown by curve III on the chart are characteristic of the heat lost in the gas by a combination of convection, conduction, and radiation from a stationary hot body which may be a hot wire as in a hot wire ballast, the heat being transferred to a cooler environment. The thermal conductivity as shown by the curve I decreases steadily as the proportion of $SF_6$ increases. This is a measure of heat transfer by conduction only. This process usually is effective only over short distances.

When gas turbulence exists as, for example, in the case of gas-cooled, rotating devices (for example, electric generators) such as conventionally illustrated in Fig. 2 highly favorable comparison can be shown. In the case of large high-speed machines, the so-called windage loss, that is, the power necessary to overcome the drag of the gas, may be as great as one-half the total energy loss. When turbulence in a gas is occurring, in such apparatus a decrease of viscosity and density of cooling gas results in a corresponding decrease of power loss due to windage in the gas filling for the enclosing casing. As evident from curve II, the density, or specific gravity, of gaseous mixtures of helium and sulfur hexafluoride is lower than that of air when the proportion of sulfur hexafluoride is less than about 18%. Consequently a substantial reduction in windage power loss results from a gas of such range of compositions as well as an improvement in transferring such heat to the environment, as for example, an enclosing casing.

It will be observed from the drawing that the addition of even a small amount of sulfur hexafluoride ($SF_6$) causes the dielectric strength to be materially increased as indicated by the markedly convex curvature of the lower end of curve IV. On the other hand, the heat transfer value as indicated by curve III, is improved somewhat. At 5% content of $SF_6$, the heat transfer characteristic of the composition is better than that of air and only slightly below that of hydrogen. The thermal conductivity is decreased but this property is not always important.

As the relative proportion of $SF_6$ is increased, the advantages become less marked. Up to about 20% of $SF_6$ the increase of dielectric strength curve IV occurs at a high rate.

The curves of Fig. 1 show specific experimental values for mixtures of helium and sulfur hexafluoride. The results illustrate the general relation, namely that the compositions high (e. g. above 60%) in content of a light gas (e. g. helium or hydrogen) and containing a relatively minor proportion (e. g. less than 40%) of an electronegative gas have heat dissipating characteristics superior to helium alone. In place of sulfur hexafluoride gas, such electronegative gases as selenium hexafluoride ($SeF_6$), sulfur oxyfluoride ($SOF_2$), dichlordifluor carbon ($CCl_2F_2$), sulfur dioxide ($SO_2$) decafluorobutane ($C_4F_{10}$), octafluoropropane ($C_3F_8$), and trifluorobromomethane ($CF_3Br$) can be used. These electronegative gases retain their gaseous state at room temperature.

The proportions of helium and electronegative gas in a gaseous composition may be chosen according to conditions. In some cases high dielectric strength may be of primary importance. For example, doubling the dielectric strength may reduce spacings between parts having differences of electric potential which may be highly desirable regardless of some sacrifice of heat conduction. In that event, the percentage of $SF_6$ or other electronegative gas advantageously may be as high as economically desirable even above 50%. If, however, the heat conduction across very narrow spaces should be of primary importance, then the amount of $SF_6$ advantageously should be kept to the lowest value consistent with desired dielectric strength. Ordinarily the content of $SF_6$ should be above 4 percent but lesser amounts may be desirable for some purposes.

For many purposes higher contents of sulfur hexafluoride, say up to about 12% sulfur hexafluoride are advantageous. The electric breakdown strength of such mixture is equal to that of air, thermal conductivity and heat transfer of such mixture are much better than that of air and the power loss due to windage will be less than for air.

Compositions comprising mainly helium and sulfur hexafluoride are safe from explosion hazard and give even better results than hydrogen as a dielectric medium for electric devices of the type producing heat during its operation, including generators, transformers, capacitors, circuit breakers, ballast tubes, gyroscopic devices and others for which both good dissipating properties and high breakdown strength are desired. Fig. 2 illustrates conventionally an electric generator having an enclosing member or casing containing as a cooling medium a gas such as hydrogen or helium and associated electronegative gas as herein described.

Although in connection with Fig. 1 especial reference has been made to gaseous compositions containing helium it should be understood that in such compositions helium may be partly or wholly replaced by hydrogen. In particular such gas compositions may contain as the electronegative gas ingredient sulfur dioxide, sulfur hexafluoride, dichlorodifluoromethane ($CCl_2F_2$), decafluorobutane ($C_4F_{10}$), octafluoropropane ($C_3F_8$), and trifluorobromomethane ($CF_3Br$). However, the mixtures consisting of helium and sulfur hexafluoride are superior to the other gaseous mixtures especially with regard to stability under corona discharge.

What I claim and desire to secure by Letters Patent of the United States is:

1. A gaseous composition consisting of helium and sulfur hexafluoride, the latter gas being present as a constituent in the range of about 4 to 50 percent by volume.

2. A gaseous composition consisting of about 88 to 96 percent by volume of helium and about 12 to 4 percent by volume of sulfur hexafluoride.

3. In an electric device of the type producing heat during its operation and having a member enclosing said device, and a gas within said member, said gas consisting of helium and sulfur hexafluoride, the latter gas being present as a constituent in the range of about 4 to 50 percent by volume.

4. A gaseous composition consisting of a major proportion by volume of helium, the balance being sulfur hexafluoride.

5. A gaseous composition consisting of 95% by volume helium and 5% by volume sulfur hexafluoride.

6. In an electric device of the type producing heat during its operation and having a member enclosing said device and a gas within said member, said gas consisting of 95% by volume helium and 5% by volume sulfur hexafluoride.

References Cited in the file of this patent

UNITED STATES PATENTS

| | | |
|---|---|---|
| 1,123,625 | Thowless | Jan. 5, 1915 |
| 1,546,234 | Hannah | July 14, 1925 |
| 1,559,182 | Rice | Oct. 27, 1925 |
| 1,657,550 | Sarthoff | Jan. 31, 1928 |
| 1,703,408 | Smith | Feb. 26, 1929 |
| 2,221,670 | Cooper | Nov. 12, 1940 |
| 2,221,671 | Cooper | Nov. 12, 1940 |
| 2,523,688 | Felici | Sept. 28, 1950 |
| 2,697,183 | Neunhoeffer et al. | Dec. 14, 1954 |

FOREIGN PATENTS

| | | |
|---|---|---|
| 553,569 | Great Britain | May 27, 1943 |